(12) United States Patent
Sompalli et al.

(10) Patent No.: US 8,007,949 B2
(45) Date of Patent: Aug. 30, 2011

(54) EDGE-PROTECTED CATALYST-COATED DIFFUSION MEDIA AND MEMBRANE ELECTRODE ASSEMBLIES

(76) Inventors: Bhaskar Sompalli, Rochester, NY (US); Hubert A. Gasteiger, Rochester, NY (US); Brian A. Litteer, Henrietta, NY (US); Susan G. Yan, Fairport, NY (US)

( * ) Notice: Subject to any disclaimer, the term of this patent is extended or adjusted under 35 U.S.C. 154(b) by 1536 days.

(21) Appl. No.: 10/909,265

(22) Filed: Jul. 30, 2004

(65) Prior Publication Data
US 2007/0184326 A1    Aug. 9, 2007

Related U.S. Application Data

(63) Continuation-in-part of application No. 10/266,965, filed on Oct. 8, 2002, now Pat. No. 6,861,173.

(51) Int. Cl.
*H01M 2/08* (2006.01)
(52) U.S. Cl. .......................... 429/450; 429/482
(58) Field of Classification Search .................. 429/12, 429/34, 36, 450, 482, 509, 510; 427/115
See application file for complete search history.

(56) References Cited

U.S. PATENT DOCUMENTS

| | | | | | |
|---|---|---|---|---|---|
| 5,041,345 | A | * | 8/1991 | O'Hara | 429/53 |
| 6,020,083 | A | * | 2/2000 | Breault et al. | 429/36 |
| 6,080,503 | A | * | 6/2000 | Schmid et al. | 429/35 |
| 6,187,466 | B1 | * | 2/2001 | Schroll et al. | 429/34 |
| 6,234,225 | B1 | | 5/2001 | Tanaka et al. | 156/390 |
| 2002/0197519 | A1 | * | 12/2002 | Einhart et al. | 429/32 |
| 2003/0157397 | A1 | | 8/2003 | Barton et al. | |
| 2004/0067407 | A1 | | 4/2004 | Sompalli et al. | |

FOREIGN PATENT DOCUMENTS

| | | |
|---|---|---|
| DE | 69204834 | 4/1996 |
| EP | 1403949 | 3/2004 |
| JP | 10154521 | 6/1998 |
| JP | 2003-017087 A | 1/2003 |
| JP | 2003-017092 A | 1/2003 |

OTHER PUBLICATIONS

PCT Search Report dated Jul. 12, 2005 for International Appln. No. PCT/US04/32602, filed Oct. 10, 2004.

* cited by examiner

*Primary Examiner* — Jennifer Michener
*Assistant Examiner* — Monique Wills
(74) *Attorney, Agent, or Firm* — Harness, Dickey & Pierce, P.L.C.

(57) ABSTRACT

A fuel cell including an anode-side catalyst coated diffusion medium and a cathode-side catalyst coated diffusion medium that sandwich an ionically conductive membrane. A sealing material is disposed between the ionically conductive membrane and the anode-side and cathode-side catalyst coated diffusion medium, wherein the sealing material is formed of a material that has a permeability that is less than a permeability of the ionically conductive member. The sealing material may also be formed of a material that is softer than the ionically conductive membrane such that the sealing material may deform and enable an membrane electrode assembly of the fuel cell to be subjected to uniform pressures throughout the assembly.

24 Claims, 3 Drawing Sheets

EDGE-PROTECTED CATALYST-COATED DIFFUSION MEDIA AND MEMBRANE ELECTRODE ASSEMBLIES

CROSS-REFERENCE TO RELATED APPLICATIONS

This application is a continuation-in-part application of U.S. patent application Ser. No. 10/266,965 filed on Oct. 8, 2002. The disclosure of the above application is incorporated herein by reference in its entirety.

FIELD OF THE INVENTION

The present invention relates to membrane electrode assemblies for a fuel cell and, particularly, to a membrane electrode assembly that has a low permeability to oxygen and hydrogen.

BACKGROUND OF THE INVENTION

Fuel cells are being developed as a power source for electric vehicles and other applications. One such fuel cell is the PEM (i.e. Proton Exchange Membrane) fuel cell that includes a so-called "membrane-electrode-assembly" (MEA) comprising a thin, solid polymer membrane-electrolyte having a pair of electrodes (i.e., an anode and a cathode) on opposite faces of the membrane-electrolyte. The MEA is sandwiched between planar gas distribution elements.

In these PEM fuel cells, the electrodes are typically of a smaller surface area as compared to the membrane electrolyte such that edges of the membrane electrolyte protrude outward from the electrodes. On these edges of the membrane electrolyte, gaskets or seals are disposed to peripherally frame the electrodes. Due to the limitations of manufacturing tolerances, however, the seals, MEA, and gas distribution elements are not adequately closely aligned. Due to the misalignment of these elements, failures at the edges the membrane electrolyte can develop and shorten the life span of the fuel cell and decrease the performance of the fuel cell.

Moreover, tensile stresses on the membrane electrolyte that are caused by membrane shrinkage when the membrane electrolyte is cycled from wet to dry conditions, and chemical degradation of the membrane electrolyte due to chemical attack of the electrolyte in the membrane and the electrodes by free radicals produced by reaction of cross-over gases (hydrogen from the anode to the cathode, and oxygen from the cathode to the anode). As such, it is desirable to develop an MEA for a fuel cell that eliminates the above drawbacks.

SUMMARY OF THE INVENTION

With the above drawbacks in mind, the inventors of the present application have developed a fuel cell including an anode-side catalyst coated diffusion medium and a cathode-side catalyst coated diffusion medium that sandwich an ionically conductive membrane. A sealing material is disposed between the ionically conductive membrane and the anode-side and cathode-side catalyst coated diffusion medium, wherein the sealing material is formed of a material that has a permeability that is less than a permeability of the ionically conductive member. In another aspect of the present invention, the sealing material is formed of a material that is softer than the ionically conductive membrane such that the sealing material may deform and enable an membrane electrode assembly of the fuel cell to be subjected to uniform pressures throughout the assembly.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
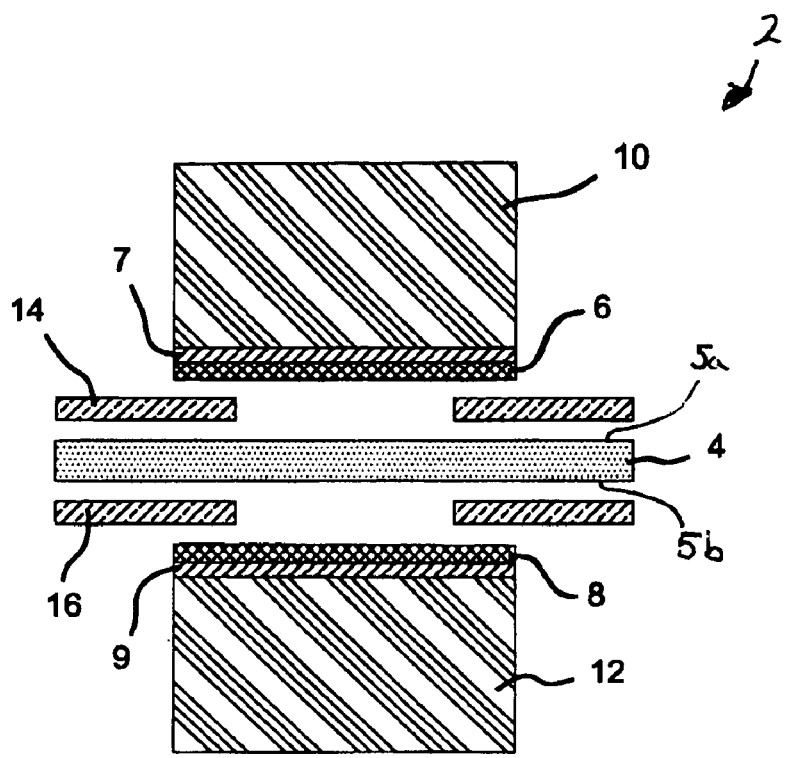
FIG. 1 is an exploded, cross-sectional view of a membrane electrode assembly according to a principle of the present invention.

FIG. 1 is an exploded, cross-sectional view of a membrane electrode assembly (MEA) according to a principle of the present invention. As shown in FIG. 1, the MEA 2 includes an ionically conductive member 4 sandwiched between an anode electrode 6 and a cathode electrode 8. The MEA 2 also includes a pair of electrically conductive members 10 and 12, or gas diffusion media 10 and 12. The ionically conductive member 4 is also peripherally surrounded by frame-shaped sealing members 14 and 16. The MEA 2 shown in FIG. 1 is sealed in the stack by polymeric seals applied between the flow field plates (also referred to as bipolar plates, not shown) and the sealing members 14 and 16.

The ionically conductive member 4 is preferably a solid polymer membrane electrolyte, and preferably a proton exchange member (PEM). Preferably, the ionically conductive member 4 has a thickness in the range of about 10 micrometers-100 micrometers and most preferably a thickness of about 25 micrometers. Polymers suitable for such membrane electrolytes are well known in the art and are described in U.S. Pat. Nos. 5,272,017 and 3,134,697 and elsewhere in the patent and non-patent literature. It should be noted, however, that the composition of the ionically conductive member 4 may comprise any of the proton conductive polymers conventionally used in the art. Preferably, perfluorinated sulfonic acid polymers such as NAFION® are used.

The ionically conductive member 4 is a cation permeable, proton conductive membrane, having $H^+$ ions as the mobile ion; the fuel gas is hydrogen (or reformate) and the oxidant is oxygen or air. The overall cell reaction is the oxidation of hydrogen to water and the respective reactions at the anode and cathode are $H_2 = 2H^+ + 2e^-$ (anode) and $½ O_2 + 2H^+ + 2e^- = H_2O$ (cathode).

The composition of the anode electrode 6 and cathode electrode 8 preferably comprises electrochemically active material dispersed in a polymer binder which, like the ionically conductive member 4, is a proton conductive material such as NAFION®. The electrochemically active material preferably comprises catalyst-coated carbon or graphite particles. The anode electrode 6 and cathode electrode 8 will preferably include platinum as the catalyst. Although the anode 6 and cathode 8 in the figures are shown to be equal in size, it should be noted that it is not out of the scope of the invention for the anode 6 and cathode 8 to be of different size (i.e., the cathode larger than the anode or vice versa). A preferred thickness of the anode and cathode is in the range of about 2-30 micrometers, and most preferably about 10 micrometers.

In accordance with a first embodiment of the present invention, the anode 6 and cathode 8 are preferably disposed on the diffusion media 10 and 12 to form catalyst-coated diffusion media (CCDM). It should be understood, however, that although the anode 6 and cathode 8 are preferably disposed on the diffusion media 10 and 12, the anode 6 and cathode 8 may also be disposed on the ionically conductive member 4 to form a catalyst coated membrane (CCM) and still be within the scope and spirit of the present invention. Specifically, the electrochemically active material of the anode 6 and cathode 8 may be disposed on surfaces 5a and 5b of the ionically conductive member that face the diffusion media 10 and 12.

The anode and cathode electrodes 6 and 8 are preferably disposed over the entire surface of the diffusion media 10 and 12 that is adjacent the ionically conductive member such that the peripheral edges of the anode 6 and cathode 8 extend to the peripheral edges of the diffusion media 10 and 12. In this manner, the edges of the anode 6, cathode 8, and diffusion media 10 and 12 rest on the sealing members 14 and 16, which as described above, are frame-shaped members disposed around a periphery of the ionically conductive member 4. It should be understood, however, that the anode electrode 6 and cathode electrode 8 do not need to be disposed to the edges of the gas diffusion media 10 and 12 to be within the scope of the present invention.

Also shown in FIG. 1 are microporous layers 7 and 9. These microporous layers 7 and 9 are preferably disposed between the electrodes 6 and 8 and the diffusion media 10 and 12, and serve as water management layers that wick water produced during the electrochemical reaction of the fuel cell away from a surface of the ionically conductive member 4. Preferably, the microporous layers, which are formed of carbon particles dispersed in a hydrophobic binder such as PTFE, are applied directly to the gas diffusion media 10 and 12.

The gas diffusion media 10 and 12 may be any gas diffusion media known in the art. Preferably, the gas diffusion media 10 and 12 are carbon papers, carbon cloths, or carbon foams with a thickness of in the range of about 100-300 micrometers. The sealing members 14 and 16 may be any material sufficient for sealing the membrane electrode assembly 2, providing mechanical support to the edges of the ionically conductive member, and preventing the cross-over of reactant gases across the ionically conductive member. In this regard, preferable materials for the sealing members 14 and 16 are materials that are elastomeric or polymeric in nature, are electrically insulating (non-conductive), and resistant to the acidic and humid fuel cell environment. That is, the sealing members must be resistant to a pH of 0 and able to withstand operating temperatures in the range of 60-120° C.

An important aspect of the present invention is that the material selected for use as the sealing members 14 and 16 should include a permeability to air (oxygen) and hydrogen gas that is less than the permeability to air (oxygen) and hydrogen gas of the ionically conductive member 4. When the permeability of the sealing members 14 and 16 is less than the permeability of the ionically conductive member 4, the cross-over of the reactant fuel cell gases is prevented at the edges of the membrane electrode assembly 2. This is advantageous because the chemical degradation of the electrolyte in the membrane and the electrode occurs due to gas cross-over through the membrane 4 (i.e., either hydrogen from the anode to the cathode, or oxygen from the cathode to the anode) and, therefore, impermeable sealing members 14 and 16 mitigate chemical degradation.

More specifically, during the normal operation of a fuel cell, hydrogen and oxygen gas may permeate across the ionically conductive member. (membrane) 4 to both the cathode 8 and anode 6, respectively, such that oxygen is in the presence of the hydrogen fuel. When these reactant gases comes into contact with the electrochemically active material of the anode 6 and cathode 8, the oxygen is reduced and reacts with $H^+$ ions produced from the oxidation of the hydrogen fuel gas. This ensuing side reaction between the reduced oxygen and $H^+$ ions produces $H_2O_2$ as follows:

$$O_2 + 2H^+ + 2e^- = H_2O_2$$

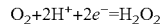

This production of $H_2O_2$ has been to known to cause a degradation of the membrane 4 and, thus, a diminished fuel cell life and performance. Furthermore, it is to be understood that other possible mechanisms of chemical degradation of the electrolyte in the membrane and the electrodes can be mitigated by preventing or at least inhibiting gas cross-over through membrane 4. These gases are more prone to permeate the membrane 4 at the edges of the membrane 4 at gaps between the elements of the fuel cell caused by manufacturing tolerances. As such, a condensed flux of the reactant gases may collect at the edges of the anode 6 and cathode 8. The degradation of the membrane 4, therefore, typically occurs at the edges of the anode 6 and cathode 8.

In order to suppress and eliminate the production of $H_2O_2$, the sealing members 14 and 16 are formed of a material that has a permeability to air and hydrogen that is less than the membrane 4. For example, when a NAFION® membrane such as N112 is used as the membrane 4, the sealing members 14 and 16 should have a permeability to air (oxygen) less than 3500 cc-mil/(100 in$^2$-24 hr-atm) at 77° F./100% RH. Preferably, the sealing members 14 and 16 should have an oxygen permeability less than or equal to 200 cc-mil/(100 in$^2$-24 hr-atm) at 77°F/100% RH. A preferable material for achieving such a permeability is, for example, ethylene tetrafluoroethylene (ETFE) which has a oxygen permeability of 184 cc-mil/(100 in$^2$-24 hr-atm) at 77° F./100% RH. Most preferably, the sealing members should have an oxygen permeability less than or equal to 25 cc-mil/(100 in$^2$-24 hr-atm) at 77° F./100% RH. Suitable materials that achieve the most preferable oxygen permeability are, for example, polyimide (sold under the tradename Kapton, 25 cc-mil/(100 in$^2$-24 hr-atm) at 77° F./100% RH) or polyvinylidene fluoride (PVDF, 3.4 cc-mil/(100 in$^2$-24 hr-atm) at 77° F./100% RH)

The permeability to hydrogen should be less than $1.5 \times 10^{-9}$ ml(STP)-cm$_{thick}$/(s-cm$^2$-cm$_{Hg}$) at 80° C., 270 kPa, 100% RH; preferably less than or equal to $1 \times 10^{-9}$ ml(STP)-cm$_{thick}$/(s-cm$^2$-cm$_{Hg}$) at 80° C., 270 kPa, 100% RH; and most preferably less than or equal to $5 \times 10^{-10}$ ml(STP)-cm$_{thick}$/(s-cm$^2$-cm$_{Hg}$) at 80° C., 270 kPa, 100% RH. Suitable materials for achieving the above hydrogen permeabilities are, for example, Kapton ($4.7 \times 10^{-10}$ ml(STP)-cm$_{thick}$/(s-cm$^2$-cm$_{Hg}$) at 80° C., 270 kPa, 100% RH) and polyethylene naphthalate (PEN, $2 \times 10^{-10}$ ml(STP)-cm$_{thick}$/(s-cm$^2$-cm$_{Hg}$) at 80° C., 270 kPa, 100% RH).

Further, although ETFE, Kapton, PVDF, and PEN are discussed as being preferable materials for attaining the above-described oxygen and hydrogen permeabilities, it should be understood that other materials may be selected for use as the sealing members 14 and 16 so long as the material has a permeability to oxygen and hydrogen less than the membrane 4. Examples of other materials include polyesters, polyamides, co-polyamides, polyamide elastomers, polyurethanes, polyurethane elastomers, silicones, and other thermoplastic elastomers. By reducing the permeability to the reactant gases at the edges of the anode 6 and cathode 8, the cross-over of the reactant gases that can cause the degradation of the membrane 4 may be reduced and/or prevented.

As stated above, the sealing members 14 and 16 also protect the edges of the membrane 4 from unmitigated heat production. That is, when the reactant gases crossover the membrane 4 at the membrane's edges and come into contact with the catalyzed carbon particles of the anode electrode 6 and cathode electrode 8, there is a chance that the reactant gases may ignite and cause small burn holes to develop in the membrane 4 which reduces the lifespan of the MEA 2. By disposing the sealing members 14 and 16 around the periphery of the membrane 4, the cross-over of the reactant gases is prevented, which prevents the ignition of the reactant gases upon contact with the catalyzed carbon particles.

When selecting appropriate materials for use as the sealing members 14 and 16 to prevent the cross-over of the reactant gases across the membrane 4 of the MEA 2, it should be understood that a first material may be selected for use as an anode-side sealing member 14 and a second material may be selected for use as a cathode-side sealing member 16. More specifically, since hydrogen fuel is used on the anode side of the MEA 2, it may be preferable to select a material for the sealing member 14 that has a lower permeability to hydrogen. Conversely, since oxygen or air is used on the cathode side of the MEA 2, it may be preferable to select a material for the sealing member 16 that has a lower permeability to oxygen. In this manner, the cross-over of the reactant gases can further be prevented and a longer lifespan of the MEA 2 can be achieved.

It should also be understood that the material for the sealing members 14 and 16 may be selected according to, in addition to its permeability to air and hydrogen, its softness at the MEA processing temperature (determined, e.g., by its glass transition temperature or its melting temperature). That is, the sealing members 14 and 16 may be formed of a material that is soft and pliable at the MEA processing temperature. In this regard, a preferable material for the sealing members 14 and 16 is, but not limited to, polyvinylidene fluoride (PVDF). Other materials include polyethylene naphthalate (PEN) and polyimide.

By utilizing sealing members 14 and 16 that are softer and more pliable, malleable, and yielding than the membrane 4, the sealing members 14 and 16 will compress and deform when the elements of the MEA 2 are compressed together to complete the assembly. In this manner, the sealing members 14 and 16 will bond to or laminate with the CCDM and membrane 4. This bonding or lamination of the elements of the MEA 2 results in a unitary structure which increases the robustness of the MEA 2 because the elements of the MEA 2 will be subjected to uniform pressures throughout the entire surface of the MEA 2. Further, since the anode 6 and cathode 8 are disposed on and to the edge of the diffusion media 10 and 12, the edges of the anode electrode 6, cathode electrode 8, and diffusion media 10 and 12 will rest on the sealing members 14 and 16. This provides further protection to the membrane 4 because the fibers of the porous gas diffusion media 10 and 12 will not be able to contact the membrane 4, which will protect the membrane 4 from puncture and prolong the lifespan of the assembly.

More specifically, it is preferable that the anode electrode 6 and cathode electrode 8 be disposed over the entire surface of the diffusion media 10 and 12 as continuous, smooth layers which provide an essentially flat surface for the other elements of the MEA 2 to rest upon. This is beneficial in that when elements such as the diffusion media 10 and 12 and sealing members 14 and 16 are compressed along with the MEA 2 in a fuel cell to facilitate and enhance the electrical conductivity of the electrons produced in the electrochemical reaction of the fuel cell, the ionically conductive member 4 will be subjected to uniform pressure throughout its surface. When the ionically conductive member 4 is subjected to uniform pressures throughout its surface, undue stress on the ionically conductive member 4 will be eliminated. As such, the tears and pinholes that may develop and shorten the life of the MEA 2 and inhibit the overall cell potential will also be eliminated.

To bond or laminate the elements of the MEA 2 together, it is preferable that the MEA 2 be compressed at pressures in the range of 25 psig to 1000 psig, and most preferable that the MEA 2 be compressed at pressures in the range of 50 psig to 100 psig. Further, it may be preferable to gently heat the MEA during compression to facilitate the bonding or lamination of the elements together. In this regard, it is preferable to heat the MEA 2 with a heated press or heated rollers to a temperature in the range of 120° F. to 400° F., and most preferable to a temperature in the range of 260° F. to 340° F. Moreover, to further facilitate the bonding or lamination of the elements of the MEA together, it may be preferable to use a sealing member 14 and 16 that is formed of a pressure sensitive material or a thermally sensitive material.

It should also be understood that the sealing members 14 and 16, when compressed and heated, may imbibe into the pores of the catalyst coated diffusion media. More specifically, the anode and cathode electrodes 6 and 8 disposed on the diffusion media 10 and 12 are preferably porous materials. When the sealing members 14 and 16 are heated and compressed, the material selected for the sealing members 14 and 16 will flow, and be taken up into the pores of porous electrodes 6 and 8. Thus, a physical attachment or physical binding results. Subsequent to heating and pressing, the material for the sealing members 14 and 16 will then harden to bond the sealing members 14 and 16 to the catalyst coated diffusion media 10 and 12 to form a unitary structure. In this manner, the edges of the anode and cathode electrodes 6 and 8 are protected from the cross-over of the reactant gases and the MEA 2 is made stronger.

Although the bonding or lamination of the elements of the MEA 2 has been described above and is preferable, it should be understood that the elements of the MEA 2 may be assembled without lamination (i.e., without application of heat and pressure) so that they are held together only by the compressive forces typically applied to a fuel cell stack (i.e., 50 to 400 psi). That is, by simply compressing the elements of the MEA 2 together via the compressive forces applied to a fuel cell stack, a ultimately laminated MEA 2 is produced after short operation of the MEA 2 in a fuel cell stack.

To provide the mechanical properties necessary to subject the MEA 2 to uniform pressures throughout the entire assembly, the thickness of the sealing members 14 and 16 can be varied according to a thickness of the diffusion media 10 and 12. That is, when a thicker diffusion medium 10 or 12 is used with a thickness of approximately 200 micrometers, it may be preferable to utilize a thicker sealing member 14 or 16. In contrast, when a thinner diffusion medium 10 or 12 is used (e.g., 100 micrometers), it may be preferable to utilize a thinner sealing member 14 or 16. In this regard, it is preferable that a thickness of the sealing members 14 and 16 lie in the range of 1-50 micrometers, more preferably in the range of 3-25 micrometers, and most preferably in the range of 4-12 micrometers. In general, the thickness of the sealing members 14 and 16 is less than 20% of the thickness of the diffusion media 10 and 12, preferably less than 5%, and most preferably between 1% and 4%. For this design criteria, the additional compressive force imposed onto the sealing member 14 in the region where it is located underneath the diffusion medium 10 is not significantly larger than the compressive force in the central region of the MEA 2. The same applies to the sealing member 16 in the region where it is located underneath the diffusion medium 12. In this case where significant additional compressive forces are avoided, mechanical membrane failures due to excessive compressive forces are avoided. Notwithstanding, any thickness for the sealing members 14 and 16 may be used when selected in relation to the thickness of the diffusion medium 10 or 12. Further, it should be understood that a first diffusion medium thickness along with a corresponding first sealing member thickness may be used that is different from a second diffusion medium thickness along with a corresponding second sealing member thickness. That is, for example, the anode side of the MEA 2 may include a diffusion medium 10 and sealing member 14 that have a different thickness than the cathode side MEA diffusion medium 12 and sealing member 16.

Figure 2:
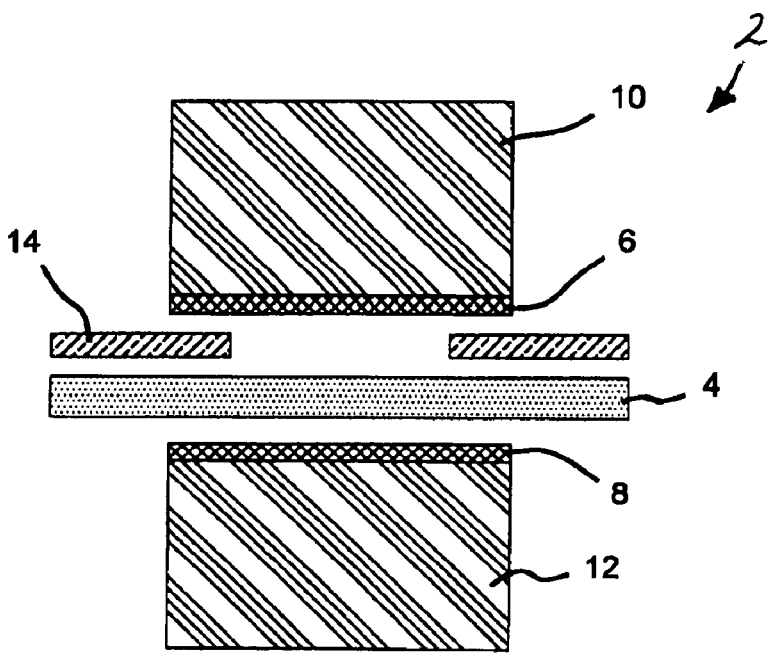
FIG. 2 is an exploded, cross-sectional view of a membrane electrode assembly according to another principle of the present invention.

Now referring to FIG. 2, a second embodiment of the present invention will be described. As shown in FIG. 2, a single sealing member 14 is disposed on only the anode side of the MEA 2. Such an arrangement is beneficial because when the MEA 2 is compressed to facilitate electrical conductivity between the elements of the MEA 2, there remains a possibility that the elements of the MEA 2 will not compress together to form a unitary structure.

Figure 3:
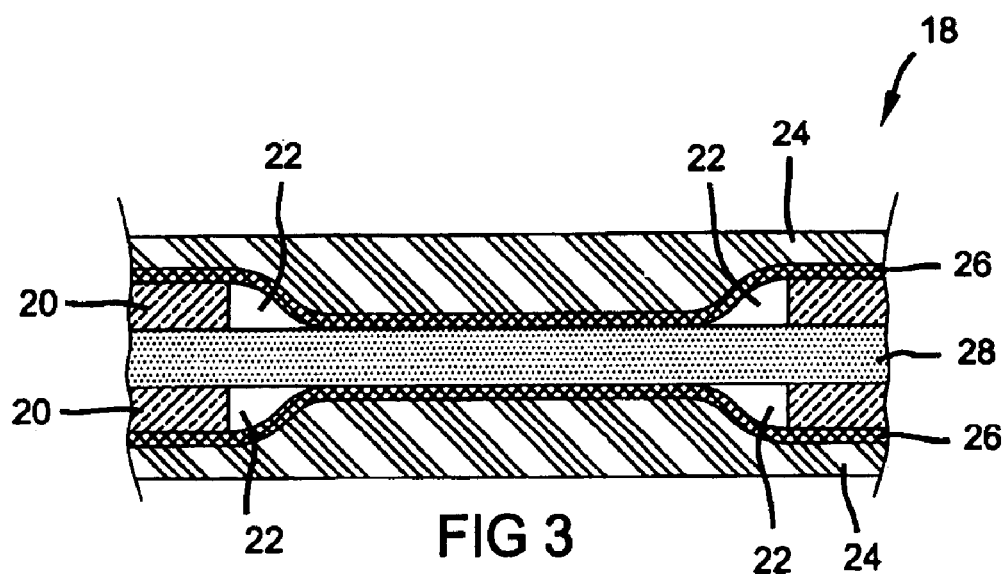
FIG. 3 is a cross-sectional view of a prior art membrane electrode assembly.

More particularly, referring to FIG. 3 which depicts a prior art MEA 18, it can be seen that when a rigid sub-gasket 20 is used, a void region 22 may form between the diffusion media 24 and the electrode 26. This void region 22 is a result of a "tenting" effect that occurs when a prior art sub-gasket 20 is used. The void region 22 occurs because the sub-gasket 20 is too rigid or too thick and will not conform when the gas diffusion media 24 are compressed against the sub-gasket 20. Therefore, in the spirit of the present invention, the void region 22 can be eliminated if either the sub-gasket 20 imbibes into the electrode 26 during the lamination process or if the sub-gasket 20 is sufficiently thin compared to the diffusion medium 24 so that the diffusion medium will conform smoothly to the sub-gasket 20 without forming a void region 22. Due to this void region 22, the unmitigated cross-over of the reactant gases may occur because the membrane 26 is unprotected in this area. Moreover, water may collect in the void region 22 which may hinder fuel cell performance.

In FIG. 2, although the sealing member 14 is depicted on the anode side of the MEA 2 and is described as being preferable, it should be understood that a single sealing member 14 may be disposed on the cathode side, as well. Such an arrangement may be preferable depending on the type of reactant gases that are used in the fuel cell. For example, when air is used as the oxidant gas instead of pure oxygen, the cross-over of oxygen across the membrane may be such that a cathode side sealing member 16 is not needed. Alternatively, when reformate is used as the hydrogen fuel, the cross-over of hydrogen gas across the membrane may be such that an anode side sealing member 14 is not needed. Moreover, it should be understood that although only a single sealing member 14 may be utilized on either the anode side or cathode side of the MEA 2, this still prevents the formation of the $H_2O_2$ because at least one of the reactant gases (hydrogen or oxygen) will still be prevented from crossing over the membrane 4.

Figure 4:
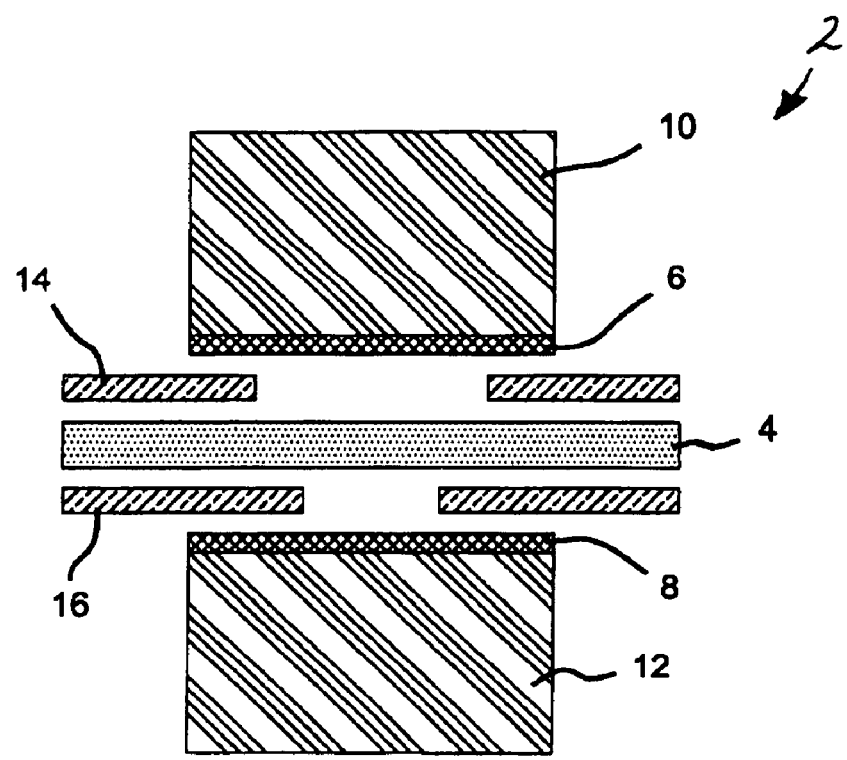
FIG. 4 is an exploded, cross-sectional view of a membrane electrode assembly according to yet another principle of the present invention.

Now referring to FIG. 4, a third embodiment of the present invention will be described. In accordance with the third embodiment of the present invention, the sealing members 14 and 16 are formed to be of different sizes. That is, as shown in FIG. 3 for example, the sealing member 16 may be formed to cover a larger surface area of the cathode electrode 8. Alternatively, the sealing member 14 may be formed to cover a larger surface area of the anode electrode 6.

By forming the sealing members 14 and 16 to be different sizes, the distribution of current and the variation of the electrode potential during fuel cell operation and in the presence of reactants (i.e., hydrogen and oxygen) can be influenced. Since both the distribution of current and the variation of the electrode potential impact the localized production of heat and the degradation rate of the electrolyte (in both the membrane and the electrodes), respectively, different sizing of the sealing members with respect to each other have an impact on MEA durability.

Figure 5:
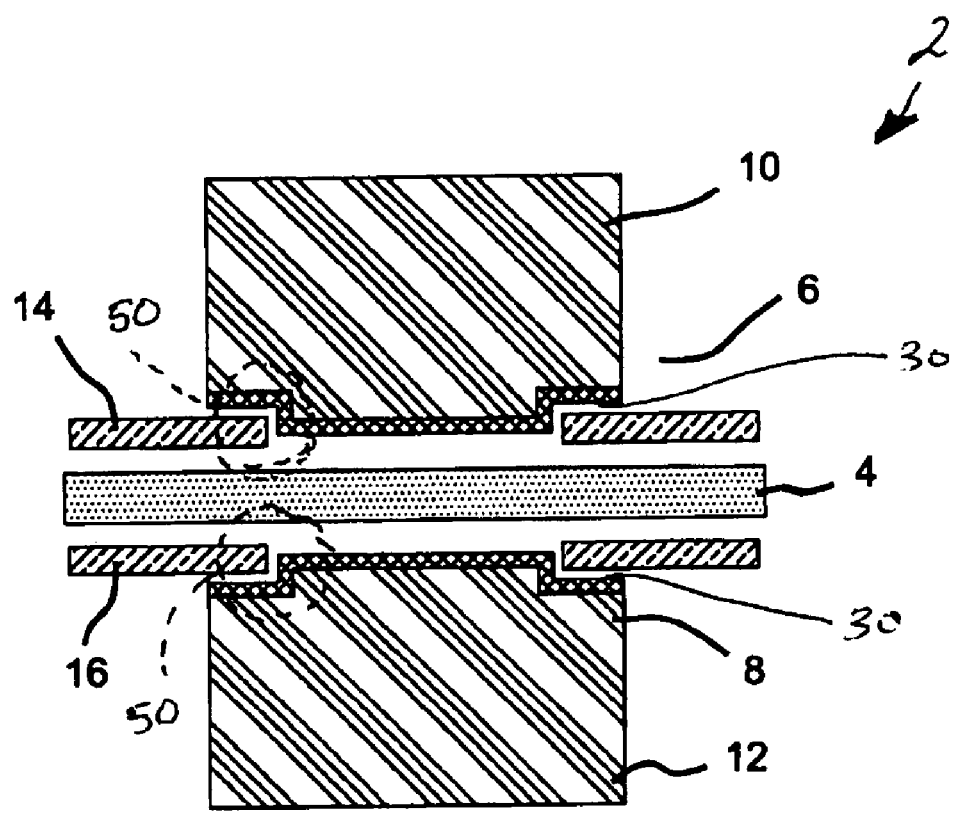
FIG. 5 is an exploded, cross-sectional view of a membrane electrode assembly according to still another principle of the present invention.

In another embodiment of the present invention, it is possible to further reduce the compressive load throughout the MEA by forming a notch 30 in the shape of a frame around the peripheral edges of the diffusion media 10 and 12. That is, referring to FIG. 5, a recessed portion 30 that corresponds to the frame-shaped sealing members 14 and 16 may be formed in the diffusion media 10 and 12 to accommodate the sealing members 14 and 16. By forming the notch or recessed portion 50 in the diffusion media 10 and 12, it is possible to reduce the compressive load needed to facilitate the sufficient electrical conductivity between the elements of the MEA 2.

Such an embodiment also ensures that the void regions 22 of the prior art membrane electrode assembly 18 shown in FIG. 3 do not occur. That is, the recessed portions 30 of the diffusion media 10 and 12 are preferably formed to a depth that corresponds to a thickness of the sealing members 14 and 16. In this manner, the diffusion media 10 and 12, sealing members 14 and 16, and ionically conductive member 4 will fit snugly together at the interfacial region 50 between each of these elements. This snug fit at the interfacial region 50 also enables the sealing member 14 and 16 to provide a more robust seal that prevents or at least inhibits the permeation or migration of the reactant gases through the membrane 4. Moreover, when the MEA 2 is compressed to facilitate electrical contact between the elements of the MEA 2, the pressure required to facilitate the electrical conductivity as well as to seal the MEA 2 is reduced.

Furthermore, although not required in this embodiment of the invention, it should be understood that any of the sealing members 14 and 16 described in the above embodiments may be used in conjunction with a diffusion medium 10 or 12 with a frame-shaped notch 30 formed therein. That is, sealing members 14 and 16 with a preselected permeability less than the membrane 4, sealing members 14 and 16 formed to be different sizes and thicknesses, and sealing members 14 and 16 that are softer than the membrane 4 may all be used in conjunction with a diffusion medium with the frame-shaped notch 30 formed around a periphery of the diffusion medium 10 and 12. Still further, it should be understood that only a single sealing member 14 may be used; or that a single diffusion medium 10 or 12 including the frame-shaped notch 30 may be used.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An assembly for a fuel cell comprising:
   an ionically conductive member;
   an electrically conductive member disposed at a surface of said ionically conductive member and including an outer peripheral edge, and said electrically conductive member comprises a frame-shaped recess around a periphery of said electrically conductive member;
   an electrochemically active material sandwiched between said ionically conductive member and said electrically conductive member, said electrochemically active material extends across said recess to said outer peripheral edge of said electrically conductive member; and
   a frame-shaped sealing member disposed in said recess, said sealing member having an inner peripheral edge smaller than said outer peripheral edge of said electrically conductive member and an outer peripheral edge larger than said outer peripheral edge of said electrically conductive member so as to be overlapping said outer peripheral edge of said electrically conductive member wherein said overlapping sufficient to prevent reactant gas cross-over,
   wherein said sealing member has a permeability that is less than a permeability of said ionically conductive member.

2. The assembly of claim 1, wherein said sealing member prevents or at least inhibits permeation of reactant gas through said ionically conductive member.

3. The assembly of claim 2, wherein said sealing member prevents or at least inhibits permeation of reactant gas from one side of said ionically conductive member to an opposite side at said peripheral edge.

4. The assembly of claim 1, wherein said permeability of said sealing member is a hydrogen permeability, an oxygen permeability, or both.

5. The assembly of claim 1, wherein said electrochemically active material is disposed on said electrically conductive member.

6. The assembly of claim 5, wherein said sealing member overlaps said electrochemically active material.

7. The assembly of claim 1, wherein said sealing member is on one side of said ionically conductive member.

8. The assembly of claim 1, wherein said sealing member is on both sides of said ionically conductive member.

9. The assembly of claim 8, wherein said sealing member on one side has a differently sized opening from said sealing member on an opposite side of said ionically conductive member.

10. The assembly of claim 1, wherein said sealing member is formed of at least one selected from a group consisting of polyimide, polyethylene naphthalate, ethylene tetrafluoroethylene, polyvinylidene fluoride, polyesters, polyamides, co-polyamides, polyamide elastomers, polyurethanes, polyurethane elastomers, silicones, and thermoplastic elastomers.

11. The assembly of claim 1, wherein said sealing member softens at a processing temperature used for the assembly of said sealing member with one or more other members of said assembly.

12. The assembly of claim 11, wherein said sealing member is imbibed into said electrochemically active material.

13. The assembly of claim 11, wherein said sealing member flows into voids formed between said electrochemically active material and said ionically conductive member.

14. The assembly of claim 1, wherein said electrically conductive member comprises a porous material, and said sealing member is imbibed into a plurality of pores in said porous material.

15. The assembly of claim 1, wherein said sealing member comprises an electrically insulating material.

16. The assembly of claim 1, wherein said sealing member comprises a material with a hydrogen permeability below $1 \times 10^{-9}$ (ml(STP)-$cm_{thick}$)/(s-$cm^2$-$cm_{Hg}$) measured at 80°C. and 100% RH.

17. The assembly of claim 1, wherein said sealing member comprises a material with a hydrogen permeability in a range of $1 \times 10^{-9}$ (ml(STP)-$cm_{thick}$)/(s-$cm^2$-$cm_{Hg}$) to $2 \times 10^{-10}$ (ml(STP)-$cm_{thick}$)/(s-$cm^2$-$cm_{Hg}$) measured at 80°C. and 100% RH.

18. The assembly of claim 1, wherein said sealing member comprises a material with an oxygen permeability below 3500 cc-mil/(100 $in^2$-24 hr-atm) measured at 77°F. and 100% RH.

19. The assembly of claim 1, wherein said sealing member comprises a material with an oxygen permeability in a range of 3.4 cc-mil/(100 $in^2$-24 hr-atm) to 200 cc-mil/(100 $in^2$-24 hr-atm) measured at 77°F. and 100% RH.

20. The assembly of claim 1, wherein said sealing member, said ionically conductive member, and said electrically conductive member including said frame-shaped recess define a sealed interfacial region between said ionically conductive member and said electrically conductive member.

21. The assembly of claim 1, further comprising a microporous layer sandwiched between said electrically conductive member and said electrochemically active material, said microporous layer being a water management layer.

22. The assembly of claim 1, wherein a thickness of said sealing member is a fraction of a thickness of said electrically conductive member.

23. The assembly of claim 22, wherein said thickness of said sealing member is below 20% of said thickness of said electrically conductive member.

24. The assembly of claim 22, wherein said thickness of said sealing member is in a range of about 1-5% of said thickness of said electrically conductive member.

* * * * *